US009820103B2

(12) United States Patent
Beaumont et al.

(10) Patent No.: US 9,820,103 B2
(45) Date of Patent: Nov. 14, 2017

(54) DIRECTION ASSISTANCE BASED ON PERSONAL EXPERIENCE

(71) Applicant: Lenovo (Singapore) Pte. Ltd., New Tech Park (SG)

(72) Inventors: Suzanne Marion Beaumont, Wake Forest, NC (US); Paul Plaskonos, Raleigh, NC (US); Rod D. Waltermann, Rougemont, NC (US)

(73) Assignee: LENOVO (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/161,464

(22) Filed: Jan. 22, 2014

(65) Prior Publication Data

US 2015/0208202 A1    Jul. 23, 2015

(51) Int. Cl.
*H04W 24/00* (2009.01)
*H04W 4/02* (2009.01)
*H04W 4/04* (2009.01)
*H04M 1/725* (2006.01)
*H04W 36/32* (2009.01)

(52) U.S. Cl.
CPC ........ *H04W 4/028* (2013.01); *H04M 1/72572* (2013.01); *H04M 2250/10* (2013.01); *H04W 4/04* (2013.01); *H04W 36/32* (2013.01)

(58) Field of Classification Search
CPC . H04W 36/32; H04W 4/028; H04M 1/72572; H04M 2250/10
USPC .................... 455/414.1, 456.1–457
See application file for complete search history.

(56) References Cited

U.S. PATENT DOCUMENTS

| | | | |
|---|---|---|---|
| 6,216,086 B1* | 4/2001 | Seymour | G01C 21/3446 701/425 |
| 6,320,496 B1 | 11/2001 | Sokoler et al. | |
| 7,574,661 B2* | 8/2009 | Matsuura | G06Q 10/10 455/414.1 |
| 2007/0015519 A1* | 1/2007 | Casey | 455/456.2 |
| 2007/0276591 A1* | 11/2007 | Lea | G06F 17/30035 701/408 |
| 2008/0046176 A1* | 2/2008 | Jurgens | G01C 21/26 701/414 |
| 2008/0214157 A1* | 9/2008 | Ramer | G06F 17/30749 455/414.1 |
| 2008/0248815 A1* | 10/2008 | Busch | 455/456.5 |
| 2009/0186628 A1* | 7/2009 | Yonker | G01C 21/26 455/456.1 |
| 2009/0216438 A1 | 8/2009 | Shafer | |
| 2009/0292528 A1* | 11/2009 | Kameyama | 704/9 |
| 2009/0319176 A1* | 12/2009 | Kudoh et al. | 701/207 |
| 2010/0023252 A1 | 1/2010 | Mays et al. | |

(Continued)

OTHER PUBLICATIONS

Suzanne Marion Beaumon, Rod D. Waltermann, "Providing Directions to a Location in a Facility" file history of related U.S. Appl. No. 14/638,542, filed Mar. 4, 2015.

(Continued)

*Primary Examiner* — Charles Appiah
*Assistant Examiner* — Jaime Holliday
(74) *Attorney, Agent, or Firm* — John L. Rogitz; John M. Rogitz

(57) ABSTRACT

A device accesses not only an electronic map to provide directions on the device, but also accesses personal experience information of a user to augment the directions.

20 Claims, 7 Drawing Sheets

(56) References Cited

U.S. PATENT DOCUMENTS

| | | | |
|---|---|---|---|
| 2010/0248745 A1* | 9/2010 | Ozawa | G01C 21/20 455/456.3 |
| 2011/0144902 A1 | 6/2011 | Forte et al. | |
| 2011/0301835 A1* | 12/2011 | Bongiorno | G01C 21/343 705/6 |
| 2012/0130630 A1* | 5/2012 | Tang et al. | 701/413 |
| 2012/0150431 A1 | 6/2012 | Ooka | |
| 2012/0208559 A1* | 8/2012 | Svendsen | G01C 21/362 455/456.2 |
| 2013/0006521 A1* | 1/2013 | Needham | G01C 21/343 701/426 |
| 2013/0029685 A1 | 1/2013 | Moshfeghi | |
| 2013/0122937 A1* | 5/2013 | Meyer | G06Q 30/0259 455/456.3 |
| 2013/0127980 A1 | 5/2013 | Haddick et al. | |
| 2013/0217366 A1* | 8/2013 | Kolodziej | G06Q 10/10 455/414.1 |
| 2013/0261966 A1* | 10/2013 | Wang | G01C 21/3469 701/533 |
| 2014/0018106 A1* | 1/2014 | Fulger | G01C 21/3415 455/456.3 |
| 2014/0057657 A1* | 2/2014 | Manber et al. | 455/456.3 |
| 2014/0082062 A1* | 3/2014 | Bellver | G06F 17/3087 709/203 |
| 2014/0214267 A1* | 7/2014 | Sellschopp | G06F 17/00 701/34.2 |
| 2015/0193819 A1* | 7/2015 | Chang | G06Q 10/1095 705/7.19 |

OTHER PUBLICATIONS

Suzanne Marion Beaumont, Rod David Waltermann, "Providing Directions to a Location in a Facility", related U.S. Appl. No. 14/638,542, Final Office Action dated Sep. 28, 2016.

Suzanne Marion Beaumont, Rod David Waltermann, "Providing Directions to a Location in a Facility", related pending U.S. Appl. No. 14/638,542, applicant's response to non-final office action filed Jul. 5, 2016.

Suzanne Marion Beaumont, Rod David Waltermann, "Providing Directions to a Location in a Facility", related U.S. Appl. No. 14/838,542, Non-Final Office Action dated Apr. 8, 2016.

Suzanne Marion Beaumont, Rod David Waltermann, "Providing Directions to a Location in a Facility", related U.S. Appl. No. 14/638,542, Non-Final Office Action dated Jan. 26, 2017.

Suzanne Marion Beaumont, Rod David Waltermann, "Providing Directions to a Location in a Facility", related U.S. Appl. No. 14/638,542, Applicants response to Final Office Action filed Dec. 14, 2016.

Suzanne Marion Beaumont, Rod David Waltermann, "Providing irections to a Location in a Facility", related U.S. Appl. No. 14/638,542, Applicant's response to Non-Final Office Action filed Apr. 7, 2017.

* cited by examiner

DIRECTION ASSISTANCE BASED ON PERSONAL EXPERIENCE

FIELD

The present application relates generally to providing directions based on personal experience.

BACKGROUND

People remember directions or landmarks based on their personal past experiences, e.g., where they were when engaged in a particular activity and with whom. Such associations, as understood herein, are not available in assistive navigation systems.

SUMMARY

Accordingly, in a first aspect an apparatus includes a processor, an output device in communication with the processor, and a memory accessible to the processor. The memory bears instructions executable by the processor to access an electronic map, access a data structure of past experience of a user, receive a user-input destination, output directions to the destination on the output device based at least in part on the map, and augment the directions with at least one output tailored to the user based at least in part on the data structure of past experience of the user.

In another aspect, a method includes identifying based on location data a first landmark associated with a location at which a device has been previously, determining a second landmark to which the device will be proximate if taken on a route determined by the device, and presenting on a display of the device second information pertaining to the second landmark. The second landmark is determined based at least partially on first information, and the first information is associated with the first landmark.

In still another aspect, an apparatus includes a first processor, a network adapter, and storage bearing instructions for execution by a second processor for receiving an indication of a destination, accessing map information, accessing a data structure of at least one previous action of a user, outputting a route to the destination on a device based on the map information, and including with the route an indication of a place along the route associated with the at least one previous action of the user based at least in part on data in the data structure. The first processor transfers the instructions over a network via the network adapter to the device, and the device is associated with the second processor.

The details of present principles, both as to their structure and operation, can best be understood in reference to the accompanying drawings, in which like reference numerals refer to like parts, and in which:

DETAILED DESCRIPTION

Figure 1:
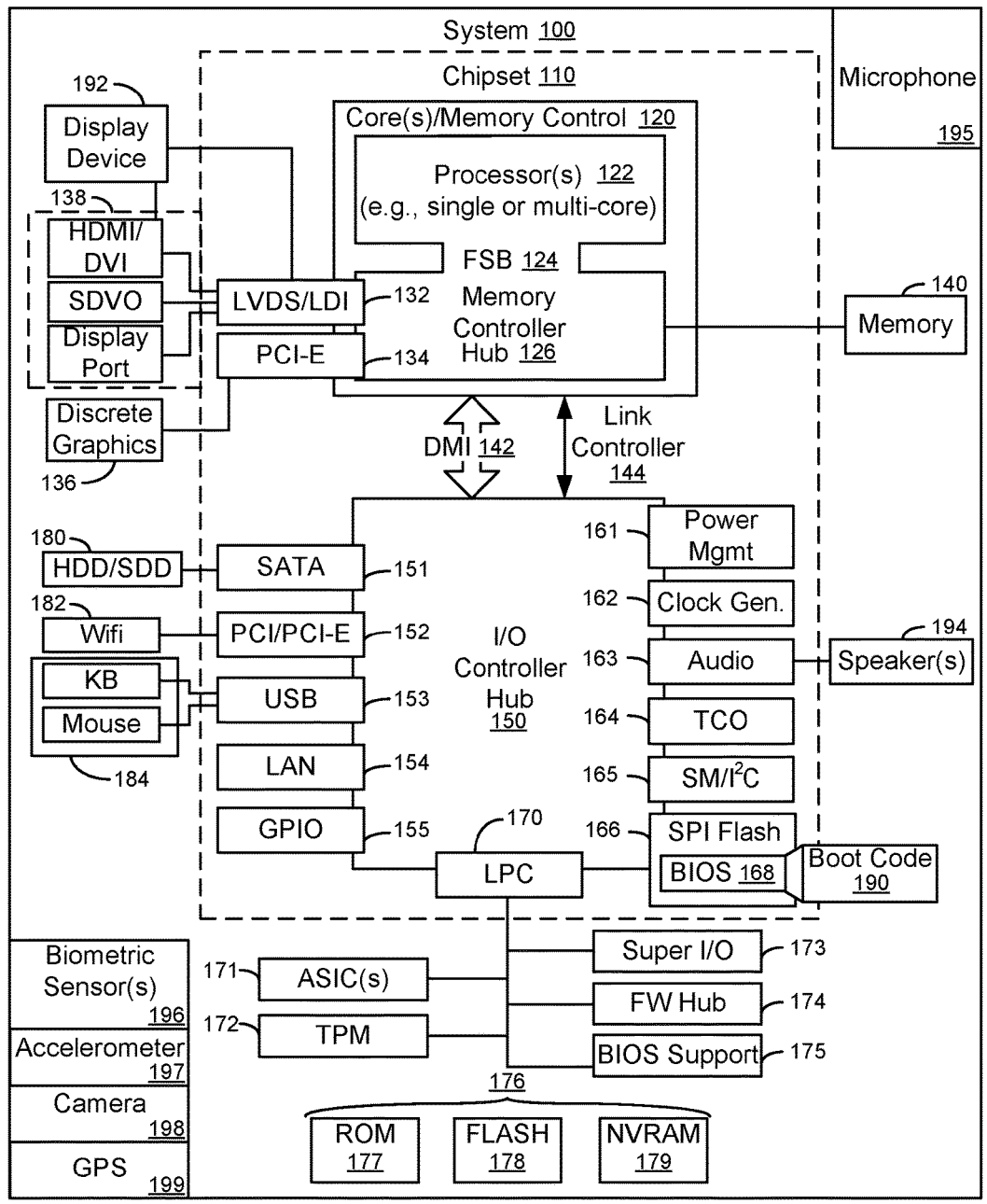
FIG. 1 is a block diagram of an exemplary system in accordance with present principles.

This disclosure relates generally to device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an exemplary block diagram of an information handling system and/or computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195 in accordance with present principles. One or more biometric sensors 196 are also shown that are in communication with the processor 122 and provide input thereto, such as e.g. heart rate sensors and/or heart monitors, blood pressure sensors, iris and/or retina detectors, oxygen sensors (e.g. blood oxygen sensors), glucose and/or blood sugar sensors, pedometers and/or speed sensors, body temperature sensors, etc. Furthermore, the system 100 may include one or more accelerometers 197 or other motion sensors such as e.g. gesture sensors (e.g. for sensing gestures in free space associated by the device with moods and/or emotions in accordance with present principles) that are in communication with the processor 122 and provide input thereto.

A camera 198 is also shown, which is in communication with and provides input to the processor 122. The camera 198 may be, e.g., a thermal imaging camera, a digital camera such as a webcam, and/or a camera integrated into the system 100 and controllable by the processor 122 to gather pictures/images and/or video in accordance with present principles. In addition, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
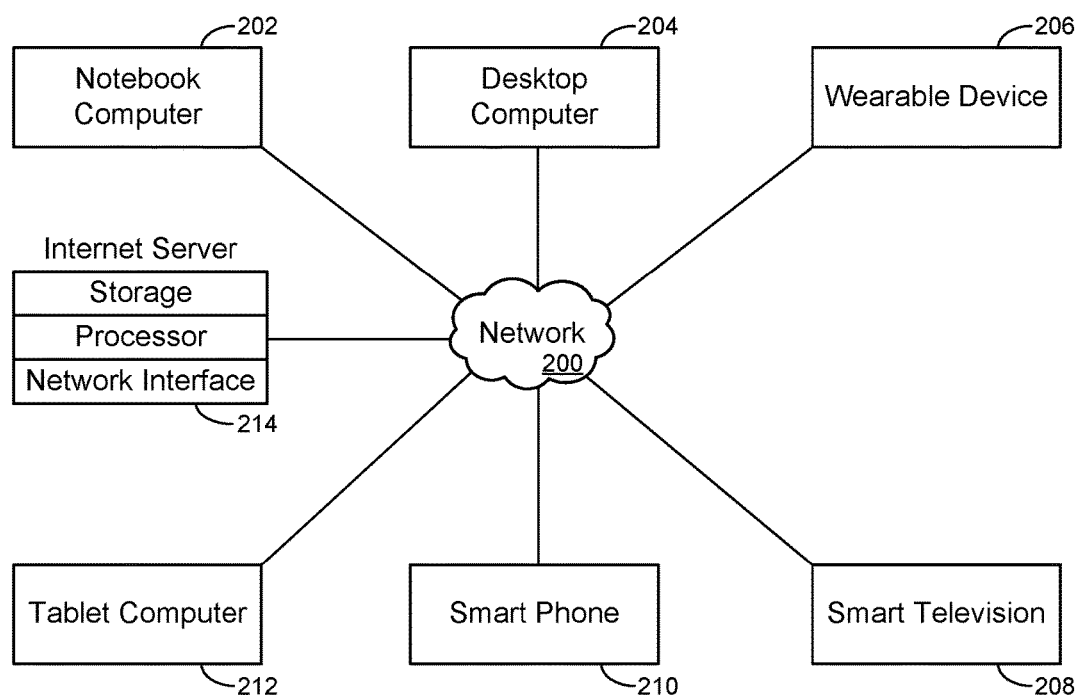
FIG. 2 is a block diagram of a network of devices in accordance with present principles.

Before moving on to FIG. 2, it is to be understood that an exemplary client device or other machine/computer may include fewer or more features than shown on the system 100 of FIG. 1. In any case, it is to be understood at least based on the foregoing that the system 100 is configured to undertake present principles.

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
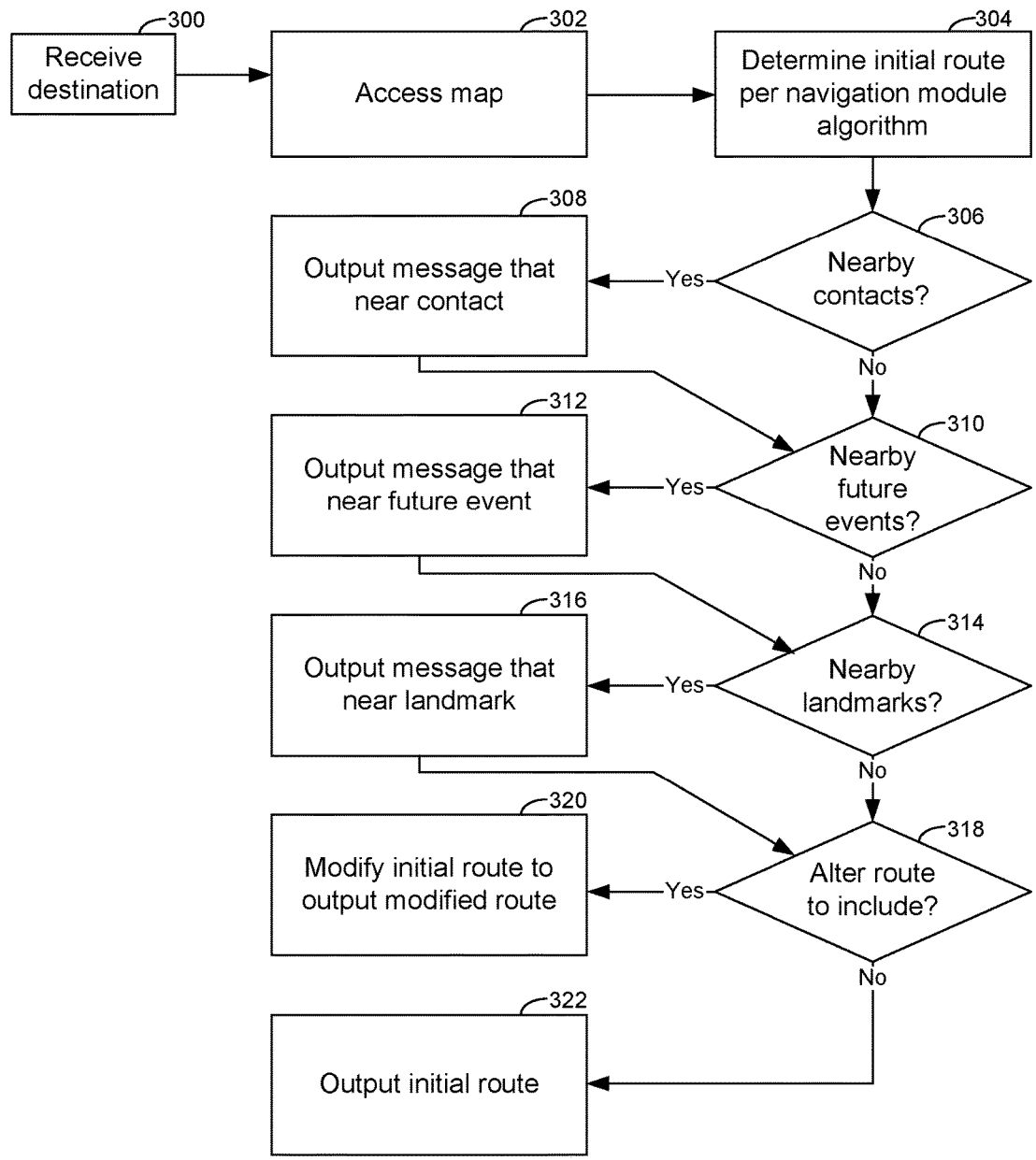
FIGS. 3 and 4 are exemplary flowcharts of logic to be executed by a system in accordance with present principles.

FIG. 3 illustrates logic that may be executed by any of the foregoing devices. Beginning at block 300, the logic receives input of a destination such as e.g. from a user providing the input. Then at block 302 the logic accesses one or more (e.g. electronic, topographical, road and highway, etc.) maps, and at block 304 determines an initial route (e.g. from the device's current location) to the destination based at least in part on the map(s) accessed at block 302 per e.g. a navigation module algorithm.

After block 304, the logic proceeds to decision diamond 306 where the logic (e.g. based on one or more data structures of contacts of a user (e.g. stored locally on the device undertaking the logic of FIG. 3, and/or stored on another device such as a smart phone in communication with the device undertaking the logic of FIG. 3, and/or stored in a cloud storage area accessible to the device, etc.)), determines whether at least one of the contacts (e.g. based on information such as an address indicated in the data structure and associated with the contact, based on an Internet search by the device for an address associated with the contact, based on a history of GPS coordinates for the device pertaining to places the device has previously been that are also associated with the contact (e.g. by the user, based on the contact's CE device communicating with the present device thereat, etc.), etc.) is one or both of nearby the current location of the device of FIG. 3 and/or nearby one or more portions of the initial route determined at 304 such that e.g. the device will at a point when following the route be nearby people associated with the contact information. A negative determination at diamond 306 causes the logic to proceed directly to decision diamond 310, which will be described shortly. However, an affirmative determination at diamond 306 causes the logic to proceed to block 308, at which the logic outputs e.g. at least one message (e.g. audibly and/or on a display of the device) that the device is and/or will be near the contact (e.g. when traveling the route). After block 308, the logic proceeds to decision diamond 310.

At decision diamond 310, the logic (e.g. based on one or more data structures of calendars and/or calendar information associated with the user (e.g. stored locally on the device undertaking the logic of FIG. 3, and/or stored on another device such as a smart phone in communication with the device undertaking the logic of FIG. 3, and/or stored in a cloud storage area accessible to the device, etc.)), determines whether at least one future event (e.g. as indicated in the data structure based on information such as an address indicated in the data structure and associated with a calendar entry for a time that is upcoming, based on an Internet search by the device for an address for the event and/or calendar entry, based on a history of GPS coordinates for the device pertaining to places the device has previously been that are also associated with the calendar entry (e.g. by the user, based on the contact's CE device communicating with the present device, based on a device history that the event is e.g. recurring and typically at the same location each time, etc.), etc.) will be one or both of nearby the current location of the device of FIG. 3 and/or nearby one or more portions of the route determined at 304 such that e.g. the device will at a point when following the route be nearby the location of the event and/or calendar entry. A negative determination at diamond 310 causes the logic to proceed directly to decision diamond 314, which will be described shortly. However, an affirmative determination at diamond 310 causes the logic to proceed to block 312, at which the logic outputs e.g. at least one message (e.g. audibly and/or on a display of the device) that the device is and/or will be near the location of the event and/or calendar entry (e.g. when traveling the route). After block 312, the logic proceeds to decision diamond 314.

At decision diamond 314, the logic (e.g. based on one or more data structures of landmarks and/or landmark information (e.g. accessed over the Internet, and/or stored locally on the device undertaking the logic of FIG. 3, and/or stored on another device such as a smart phone in communication with the device undertaking the logic of FIG. 3, and/or stored in a cloud storage area accessible to the device, etc.)), determines whether at least one landmark (e.g. as indicated in the data structure based on information such as an address for the landmark, based on an Internet search by the device for an address for the landmark, based on a history of GPS coordinates for the device pertaining to places the device has previously been that include the landmark and/or identifying information for the landmark, etc.) will be one or both of nearby the current location of the device of FIG. 3 and/or nearby one or more portions of the route determined at 304 such that e.g. the device will at a point when following the route be nearby the landmark(s). A negative determination at diamond 314 causes the logic to proceed directly to decision diamond 318, which will be described shortly. However, an affirmative determination at diamond 314 causes the logic to proceed to block 316, at which the logic outputs e.g. at least one message (e.g. audibly and/or on a display of the device) that the device is and/or will be near the landmark (e.g. when traveling the route). After block 316, the logic proceeds to decision diamond 318.

At decision diamond 318, the logic determines whether to alter the route to include passing by (e.g. on the nearest proximate street thereto based on e.g. a threshold distance from at least one point along the route) the person associated with the contact, the location of the event, and/or the landmark. An affirmative determination at diamond 318 causes the logic to move to block 320, at which the logic modifies the initial route to output a modified route that includes passing by one or more of the person, the location of the event, and/or the landmark. However, a negative determination at diamond 318 instead causes the logic to proceed to block 322, at which the logic outputs and/or continues to output the initial route.

Figure 4:
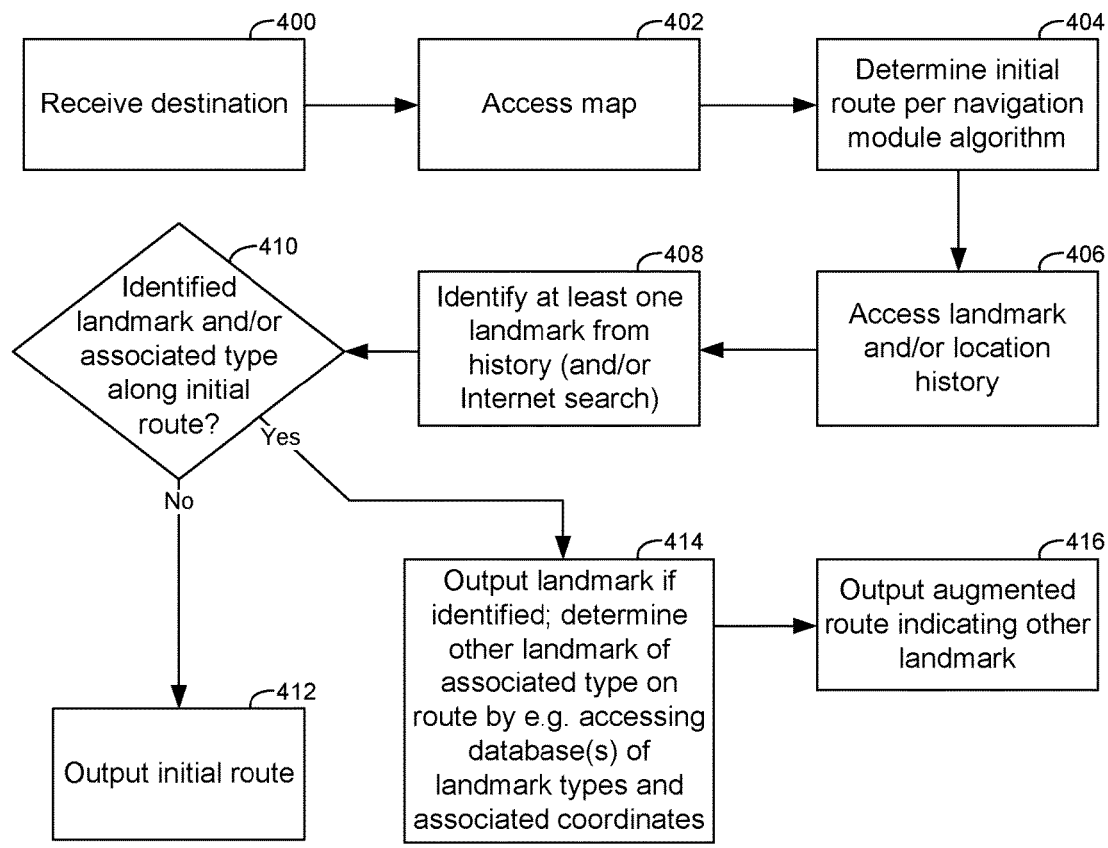

Continuing the detailed description in reference to FIG. 4, it is to be understood that it may be undertaken in conjunction with the logic of FIG. 3 in some embodiments, and/or may be separately executed by a processor in accordance with present principles. Regardless, FIG. 4 begins at block 400 where the logic receives input of a destination such as e.g. from a user providing the input. Then at block 402 the logic accesses one or more (e.g. electronic, topographical, topological, and/or road and highway, etc.) maps, and at block 404 determines a route (e.g. from the device's current location) to the destination based at least in part on the map(s) accessed at block 402 per e.g. a navigation module algorithm. The logic then proceeds to block 406 where the logic accesses one or more histories and/or data structures of landmarks, and/or other landmark information (e.g. landmark type), and/or previous locations of the device (e.g. as indicated as location coordinates in the history and/or data structure(s)) that may be e.g. accessed over the Internet, and/or stored locally on the device undertaking the logic of FIG. 4, and/or stored on another device such as a smart phone in communication with the device undertaking the logic of FIG. 4, and/or stored in a cloud storage area accessible to the device, etc.).

After block 406 the logic proceeds to block 408 where the logic identifies (and/or determines) at least one landmark from and/or in the data structure and/or history (e.g. at which the device has been previously as indicated in the history and/or data structure), and then proceeds to decision diamond 410 at which the logic determines whether the landmark identified at block 408 is along and/or proximate to (e.g. within a threshold distance of at least a portion of) the route determined at block 404. At negative determination at diamond 410 causes the logic to proceed to block 412, at which the logic outputs and/or continues to output the route without an indication of the landmark(s).

However, an affirmative determination at diamond 410 instead causes the logic to proceed to block 414. At block 414, the logic outputs an (e.g. audible and/or visual (e.g. on a display of a device)) indication of the one or more landmarks determined to be e.g. proximate to the route, e.g. the landmark identified at block 408. Also at block 414, the logic determines one or more other landmarks (e.g. other than the one(s) identified at block 408) along and/or proximate to (e.g. within a threshold distance of a least a point along) the route (e.g. based on location coordinates and/or map metadata for the other landmark) that is e.g. the same landmark type as the landmark identified at block 408 (e.g. based on landmark information for the landmark identified at block 408 such as stored metadata associated therewith indicating the landmark type, and/or as determined based on e.g. an Internet search by the device of the landmark and a parsing of information from the search to determine and/or derive (e.g. based on key word recognition) at least one type for the landmark).

The logic may then proceed from block 414 to block 416, where the logic may modify the route to output a (e.g. modified and/or different in at least one respect) route that includes passing by the identified and/or other landmark(s). Note that examples of landmark types in accordance with present principles are e.g. a historical site (e.g. a site of historical significance, a site classified as a historic site by e.g. a governmental authority and/or private interest group, etc.), a naturally occurring geographic feature (e.g. a mountain, a rock formation, a river, a beach, etc.), and a tourist attraction (e.g. such as Sea World, Disneyland, the San Diego Zoo, etc.).

Figure 5:
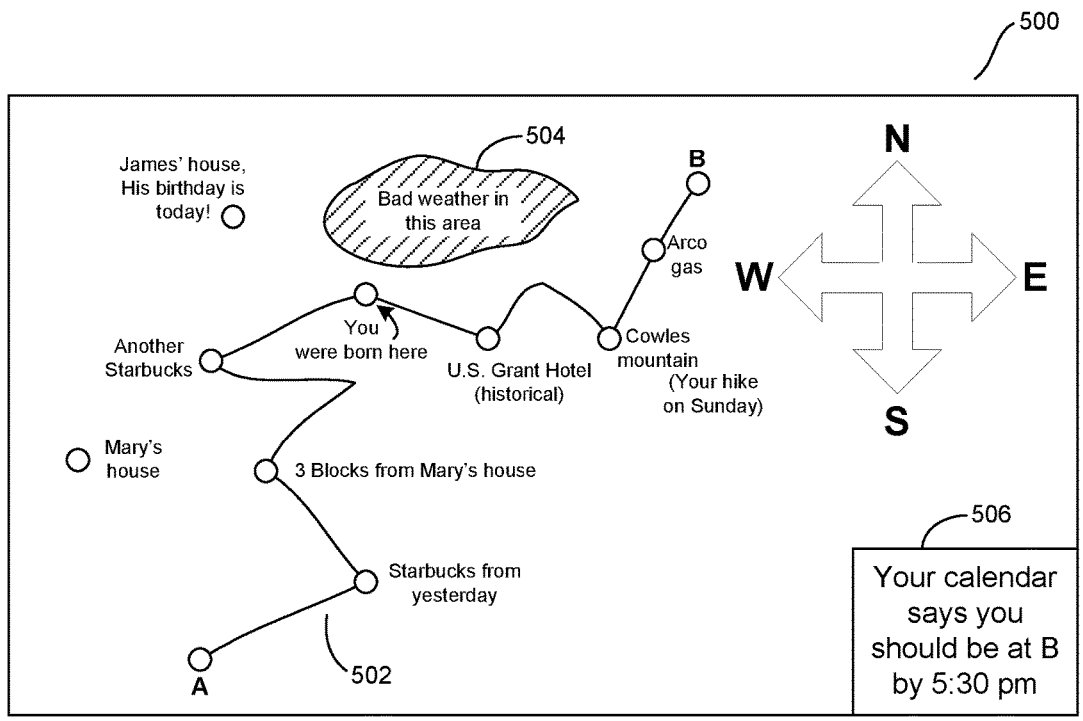
FIGS. 5-7 are exemplary user interfaces (UI) presentable on a system in accordance with present principles.

Now in reference to FIG. 5, it shows an exemplary output of map information 500 as e.g. presented on a display of a device in accordance with present principles. In some embodiments, the map information 500 may be presented in the form of e.g. a road map (referred to below simply as the map 500 for convenience) with a determined route 502 overlaid and/or presented thereon, and also e.g. with places indicated on the map 500 that have a unique and/or relevant context for a particular user of the device presenting the map 500 in accordance with present principles. Thus, it may be appreciated from the map 500 as shown that the route 502 may e.g. indicate turns to be made at various places and landmarks, and/or that at least a portion of the route 502 is proximate (e.g. within a threshold distance) of at least one place, landmark, person associated with a contact in a user's address book, etc.

For instance, the map 500 may indicate a point along the route (e.g. as altered and/or augmented to include the following locations) that passes and/or is proximate to a coffee shop at which the device was located yesterday, a point along the route that is three blocks from a friend's house, a point along the route that is proximate to another store (e.g. a coffee shop) of the same store type as a previously visited store even if the device has never been located at the other store, and/or a place of personal significance to the user such as where a user of the device was born (e.g. as input by the user to the device, based on information accessible to the device such as public birth records accessible over the Internet, etc.). Still further, the map 500 may indicate e.g. places not along the route but nonetheless proximate to the route (e.g. within a predefined and/or user-defined distance) such as an indication of a location of a person's house e.g. if it is determined by the device that the person's birthday is the same day as the day the route is to be taken and/or traveled. Moreover, if desired the device presenting the map 500 may be configured to e.g. alter the route to avoid a current weather condition and/or weather condition to occur at a time at which the device predicts the device will be passing the location of the weather, and may even include an overlay area 504 outlining and/or delineating the area in which the weather is forecasted to occur and/or currently occurring. Also if desired, the map 500 may include indications of historical sites and naturally occurring geographic features that will be passed by the route 502 (e.g. where the route 502 may have been altered to pass the site and/or feature), along with an indication of a gas station of the same proper noun and/or owned by the same company as another gas station frequented by the device as indicated in e.g. a device history. Note also that information may be presented next to one or more of the historical site, geographic feature, and any of the other indications on the map 500 indicating e.g. that the user is scheduled to go to that place in the future (e.g. based on calendar information accessible to the device in accordance with present principles). Furthermore, as shown the map 500 may include an indication 506 e.g. as derived from calendar information that the user should arrive at the destination (e.g. point "B" as indicated on the map 500) by a particular time.

Based at least on FIG. 5, it may be appreciated that map information in accordance with present principles may included information and/or messages that indicate a proper noun (e.g. of a person, place, and/or thing), information for and/or pertaining to a past day, an identification of a location associated with the user of the device and/or another person, an indication that the directions take the user in proximity to a location associated with the user or another person, etc.

Figure 6:
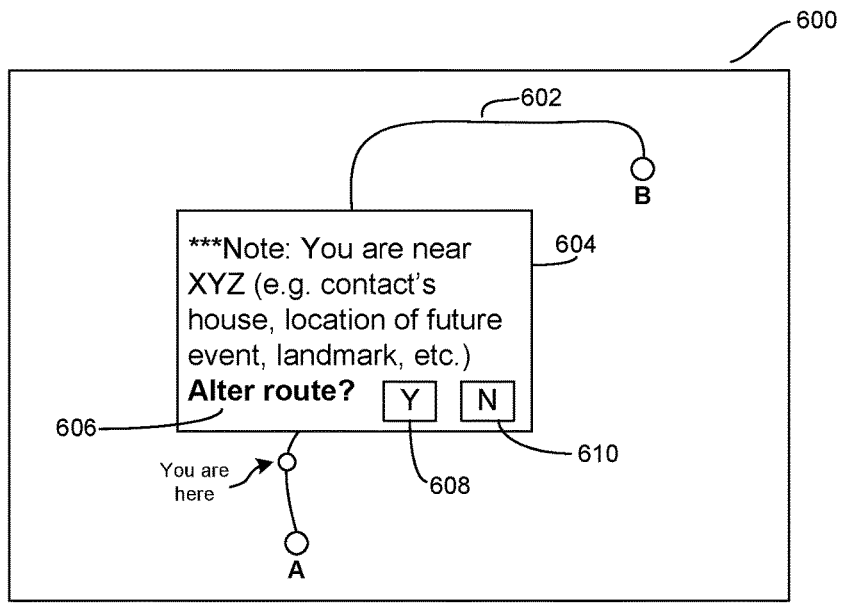

FIG. 6 shows another exemplary output 600 that may be presented on a device in accordance with present principles. The output 600 includes a route 602 determined by a device in accordance with present principles. The output 600 may also include a window 604 overlaid on at least a portion of the route 602 that indicates e.g. that the device is and/or will be near a particular location in accordance with present principles when traveling the route, such as e.g. the personal residence of a friend of the user (e.g. based on social networking information accessed by the device to e.g. determine the friend and/or information about the friend), a location of an event to take place in the future, a landmark, etc. Note that a prompt and/or question 606 is presented as part of the window 604 asking whether the user would like the route being taken and/or to be taken to be altered to include the particular location. Accordingly, a yes selector element 608 is shown that is selectable to automatically without further user input cause the device to alter the route as presented accordingly, and a no selector element 610 is also shown that is selectable to automatically without further user input cause the device to decline to alter the route.

Figure 7:
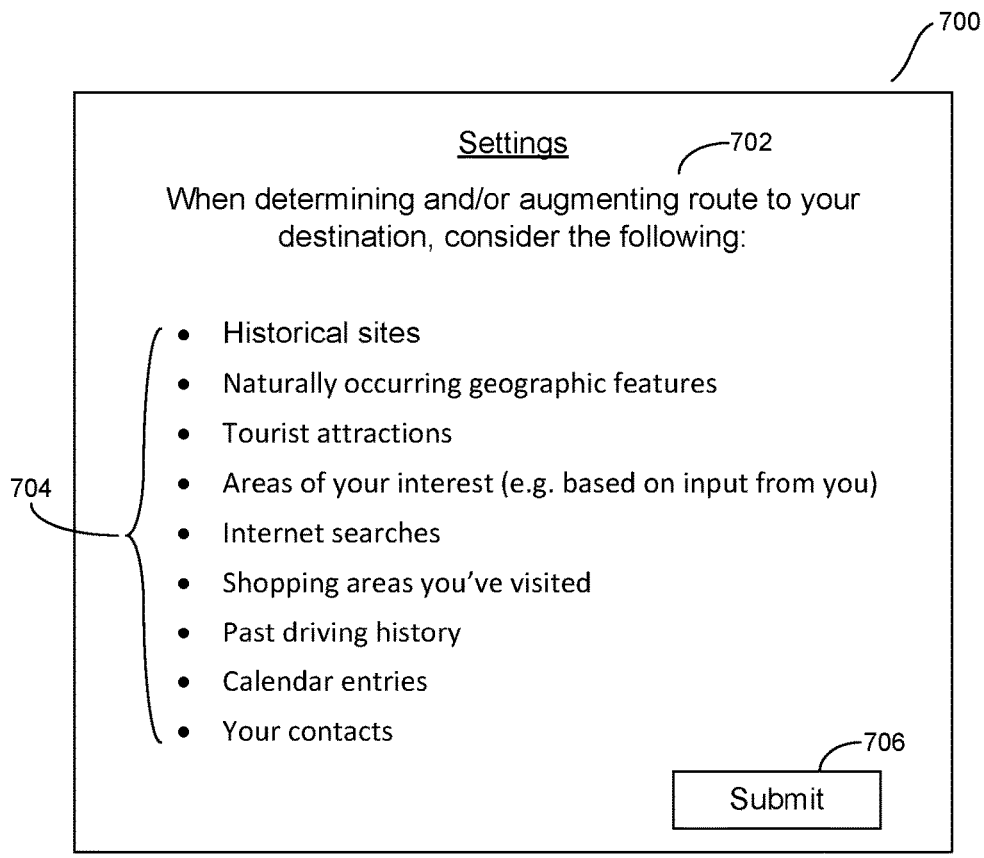

Continuing the detailed description in reference to FIG. 7, it shows an exemplary settings user interface (UI) 700 presentable on a device for configuring one or more settings for determining a route in accordance with present principles. Thus, the settings UI 700 includes at least one setting 702 providing various particular places, and/or location types, which the device may be configured to include in a route, and/or to alter and/or augment a route to include in accordance with present principles. As examples, the settings UI 700 may present options 704 for inclusion on a route output and/or determined by the device, where the options 704 selectable using e.g. respective radio buttons may include one or more of the following: historical sites, naturally occurring geographic features, tourist attractions, areas of particular interest to the user of the device, places or things searched over the Internet (e.g. using the device), shopping areas which the device and/or user has previously visited, past driving history of the user (e.g. if the device determines based on usage history the user prefers to make right turns, prefers to pass by a particular location if within a threshold distance of what would otherwise be the route, etc.), calendar entries of one or more calendars, and/or contacts of the user. Note that the UI 700 also includes a submit selector element 706 selectable to configure the device to include places and/or types corresponding to each of the respectively selected options 704.

Figure 8:
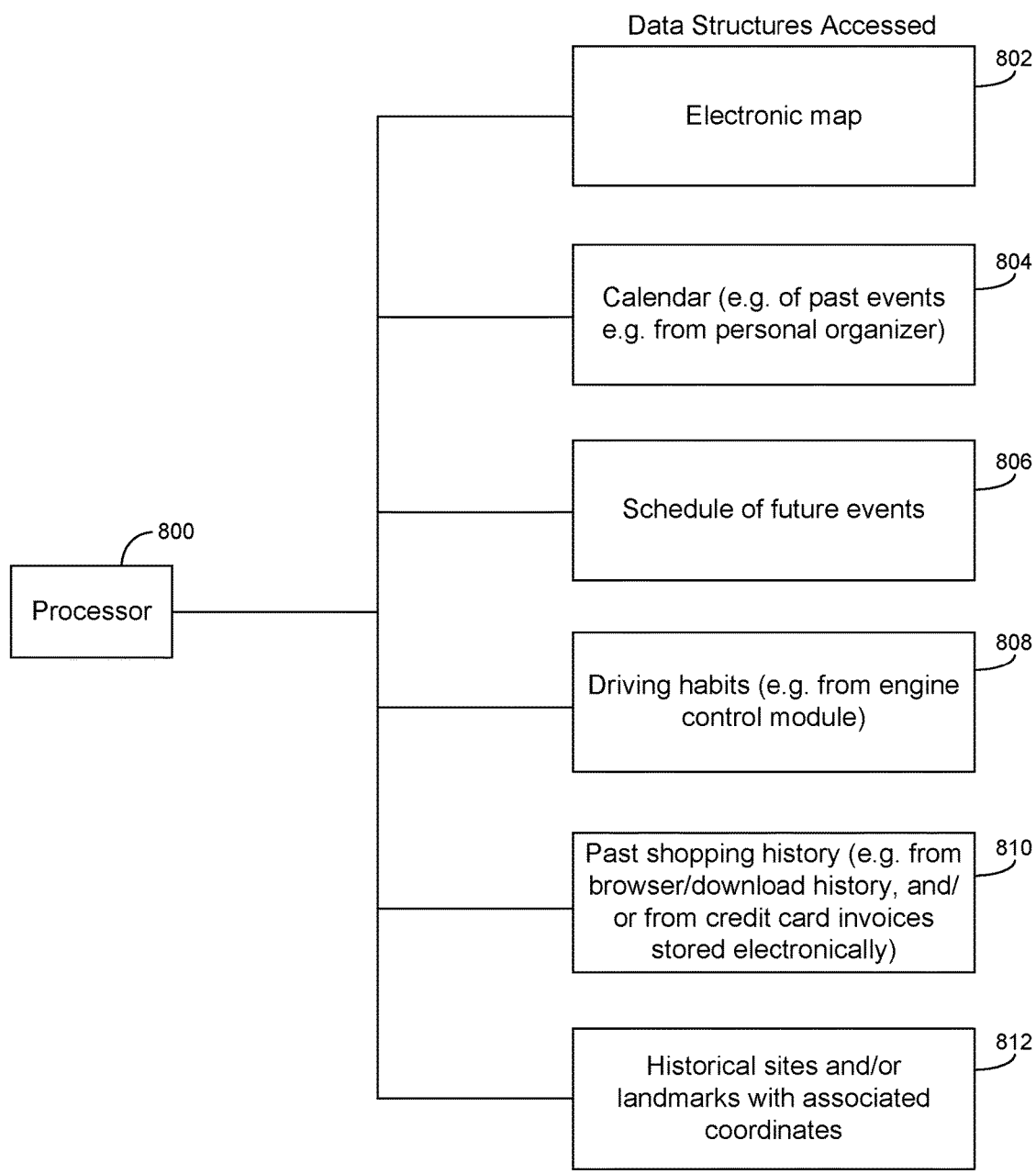
FIG. 8 is an exemplary illustration of data structures accessible to a processor of a system in accordance with present principles.

Reference is now made to FIG. 8, which shows exemplary data structures accessible to a processor 800 of a device such as the system 100 in accordance with present principles. For instance, data structures accessible to the processor 800 include an electronic map data structure 802, a calendar (e.g. of past events from e.g. a personal organizer) data structure 804, a schedule of future events data structure 806, a driving habits data structure 808 (e.g. stored in and/or provided by an engine control module of a vehicle in which the device is disposed and/or travels in), a past shopping history data structure 810 (e.g. from an Internet browser and/or download history, and/or from e.g. banking information such as credit card invoices), and/or a historical sites and/or landmark data structure 812 that may include e.g. GPS coordinates for the site(s) and/or landmark(s) to thus identifying the location of the site(s) and/or landmark(s) and indicate them on a route and/or map in accordance with present principles.

Without reference to any particular figure, it is to be understood that while a user may be prompted in accordance with present principles for whether to alter an initially determined route as described herein, the device may also or instead do so automatically without user input (e.g. without further user input e.g. prior to receiving input for a particular destination but after the user configures settings such as those discussed in reference to FIG. 7), and/or the device may initially determine a route to include indications, information, etc. such as landmarks.

Also note that e.g. geocoding and reverse geocoding may be used in accordance with present principles. Thus, e.g., a device may take GPS coordinates for a location at which the device was previously and reverse geocode them to determine e.g. a street address for the location, and/or the name of the location, and/or the type of location.

Still without reference to any particular figure, note that still other information maybe accessed to determine whether to alter a route to take a user past and/or proximate to a location, such as e.g. Facebook likes. For instance, if the user has liked a location and/or entity associated with a location on Facebook, the device may access the user's likes and/or social networking account to determine as much and then locate the location associated with the entity (e.g. by performing an Internet search for the location and/or entity) and output it on a representation of a map such as is shown in FIG. 5 above.

Again without reference to any particular figure, note that information and/or data on and/or regarding routes taken in the past may be used in accordance with present principles for outputting one or more routes to a location (e.g. another location than the past route). E.g., routes previously taken (by the person and/or device) may be used to determine and/or indicate the type(s) of routes that the person prefers to take (e.g., the person prefers to take highways when possible as opposed to side and/or surface roads, the person prefers to pass by certain businesses and/or business types, the person prefers to pass near the person's contacts and/or friends as determined based on e.g. address book information and/or social networking location information for the contacts and/or friends). In addition to or in lieu of the foregoing, past information may include data on user preference for particular routes based on the time of day (and/or day of the week, month, day of the month, year, day of the year, time of year, etc.) such as e.g. deriving information from past routes for the type of routes the person prefers to take at certain times of day or certain days of the week (e.g. the person likes to avoid highways during rush hour such as e.g. 8 a.m. to 9 a.m., and/or e.g. the user prefers highways on weekdays and side roads on weekends). Also in addition to or in lieu of the foregoing, past information may be used to derive the type(s) of routes the person prefers during various weather conditions (e.g., that the user prefers to avoid a certain hill and/or portion of a street during inclement weather such as when it is snowing and/or when there is now on the ground and/or road). Also in addition to or in lieu of the foregoing, past information may be used to derive the type(s) of routes the person prefers during certain seasons (e.g., that the user prefers to take a longer way to a location past a meadow the user likes in the spring). Also in addition to or in lieu of the foregoing, user preferences may be used by the device to determine particular route choices to present e.g. when more than one route to the destination is available and/or determined but where e.g. only a certain number of routes are to be presented (e.g. based on user configuration of settings for the device, based on available space on the display to present routes, based on configurations set by the provider of an application undertaking present principles, etc.), and/or to determine whether to present new routes when they become available (e.g. based on the device's changing location and/or new route options being available regardless of location (e.g. if a traffic hazard no longer exists), and/or for a new locale altogether). Thus, for example, a device undertaking present principles may select a route to present on a display screen to a first location based on the characteristics of a past route to a second location (e.g. different than the first location) based on user preferences and/or data associated with the route to the first location that was previously taken.

Present principles further recognize that although e.g. a software application for undertaking present principles may be vended with a device such as the system 100, it is to be understood that present principles apply in instances where such an application is e.g. downloaded from a server to a device over a network such as the Internet.

Based on the present application, it may now be appreciated that systems and methods are provided for using an individual's activities, contacts, habits, etc. to suggest routes to take to a destination and/or to convey prompts, using e.g. landmarks and/or locations that are familiar to the user. Landmarks may in some embodiments be determined based on publically available information, "dead reckoning" by the device, and/or from information gathered from current context and history of the device. E.g., directions may be annotated with personal associations such as "You are near the Starbuck's you visited yesterday," or, "You are three blocks past Mary's house." It is to thus be understood that present principles may take a user's driving habits into account to determine alternative routes that cater to the user's preferences.

As another example, a route that albeit may be somewhat longer in distance than may be necessary to travel to a desired destination may be suggested that nonetheless allows the user to drive in the user's preferred driving style. As yet another example, a device in accordance with present principles may take into account the user's schedule (e.g. as indicated in an electronic calendar) as well as the user's driving and/or shopping habits, to provide a route that takes the user by certain locations to which the user has an affinity such as a shopping mall. Providing still another example, a device in accordance with present principles may take into account the user's activities (and/or most frequent activities if engaged in more than e.g. a threshold number of times), the user's favorite places, landmarks, and/or points of interest when providing a route. E.g., the device may provide output such as "There's a Starbuck's ahead at the next highway exit," or "To get to your destination, turn left at the place you got frozen yogurt last Saturday night." The device may also provide output such as e.g. "no Kangaroo gas stations on this route," and/or "Your route takes you close by James' house. Today is James' birthday."

In addition to the foregoing, a device in accordance with present principles may take into account the user's current schedule. E.g., if the user is scheduled to pick up their child at three o'clock, the device may route the user in a manner that would still allow the user to make that appointment but nonetheless e.g. still pass a landmark. The device may also take into account e.g. the user's schedule and location of upcoming appointments in conjunction with current and/or predicted weather conditions and patterns to recommend an alternate route or more appropriate departure time which will allow the user to nonetheless arrive at their destination on time.

It may thus be appreciated that the present application in at least one aspect overlays an individual's past, current and/or evolving context, habits, and places of interest onto a navigation assistance map to offer meaningful and relevant directions. Moreover, the routes and prompts may be customized to each user's activities, and/or needs, as they go through life.

While the particular DIRECTION ASSISTANCE BASED ON PERSONAL EXPERIENCE is herein shown and described in detail, it is to be understood that the subject matter which is encompassed by the present application is limited only by the claims.

What is claimed is:
1. An apparatus, comprising:
a processor;
an output device in communication with the processor; and
storage accessible to the processor and bearing instructions executable by the processor to:
access information useful for providing directions to a destination;
based at least in part on the information and based at least in part on identification of at least one point of interest associated with a future event, output directions to the destination on the output device along with an indication of a location associated with the at least one point of interest, the at least one point of interest associated with the future event being identified based at least in part on the future event being associated with a device associated with a contact in a contact data structure, the indication of the location associated with the point of interest being output based at least in part on identifying that the device associated with the contact communicated with the apparatus on a recurring basis at the location.

2. The apparatus of claim 1, wherein the output comprises a message indicating a proper noun associated with the location, the message further comprising an option selectable by the user to alter the directions to include a route past the location.

3. The apparatus of claim 1, wherein the output device is a display, and wherein the instructions are executable to:

present on the display a user interface (UI) comprising plural options respectively selectable for augmenting directions based on respective different parameters.

4. The apparatus of claim 1, wherein the indication comprises at least one instruction on a route to take to travel to the location.

5. The apparatus of claim 1, wherein the instructions are executable by the processor to output the directions based at least in part on an identified preference of the user to make turns in a first direction rather than a second direction different from the first direction.

6. The apparatus of claim 1, wherein the instructions are executable by the processor to output the directions based at least in part on an identified preference of the user to pass a particular type of location.

7. The apparatus of claim 1, wherein the instructions are executable by the processor to output the directions based at least in part on an identified preference of the user to pass a particular location.

8. The apparatus of claim 1, wherein the instructions are executable by the processor to output the directions based at least in part on an identified preference of the user to travel using a travel medium of a particular travel medium type, the travel medium type selected from the group consisting of: highways, surface roads.

9. The apparatus of claim 1, wherein the instructions are executable by the processor to output the directions based at least in part on an identified preference of the user to avoid a particular road during an inclement weather condition.

10. The apparatus of claim 1, wherein the instructions are executable by the processor to output the directions based at least in part on an identified preference of the user to travel a particular travel medium type at a particular time of day.

11. The apparatus of claim 1, wherein the instructions are executable by the processor to output the directions based at least in part on an identified preference of the user to travel a particular travel medium type on a particular day.

12. The apparatus of claim 1, wherein the instructions are executable by the processor to output, with the directions, a recommended departure time determined based at least in part on information in a calendar accessible to the apparatus.

13. The apparatus of claim 1, wherein the instructions are executable by the processor to output, with the directions, a recommended departure time determined based at least in part on information accessible to the apparatus pertaining to a weather condition.

14. The apparatus of claim 1, wherein the instructions are executable by the processor to:
based at least in part on identification of at least a first activity being participated in by a user at least a threshold number of times greater than one, output the directions to the destination on the output device along with an indication of a location associated with the first activity.

15. A method, comprising:
accessing, using an apparatus, information useful for providing directions to a destination;
outputting, based at least in part on the information and based at least in part on identification of at least one point of interest associated with a future event, directions to the destination on an output device along with an indication of a location associated with the at least one point of interest, the at least one point of interest associated with the future event being identified based at least in part on the future event being associated with a device associated with a contact in a contact data structure, the indication of the location associated with the point of interest being output based at least in part on identifying that the device associated with the contact communicated with the apparatus on a recurring basis at the location.

16. The method of claim 15, wherein the output device is a display, and wherein the method comprises:
presenting on the display a user interface (UI) comprising plural options respectively selectable for augmenting directions based on respective different parameters.

17. The method of claim 15, wherein the indication comprises at least one instruction on a route to take to travel to the location.

18. A computer readable storage medium (CRSM) that is not a transitory signal, the computer readable storage medium comprising instructions executable by at least one processor of an apparatus to:
access information useful for providing directions to a destination;
based at least in part on the information and based at least in part on identification of at least one point of interest associated with a future event, output directions to the destination on an output device along with an indication of a location associated with the at least one point of interest, the at least one point of interest associated with the future event being identified based at least in part on the future event being associated with a device associated with a contact in a contact data structure, the indication of the location associated with the point of interest being output based at least in part on identifying that the device associated with the contact communicated with the apparatus on a recurring basis at the location.

19. The CRSM of claim 18, wherein the instructions are executable by the at least one processor to output, with the directions, a recommended departure time determined based at least in part on information in a calendar accessible to the apparatus.

20. The CRSM of claim 18, wherein the instructions are executable by the at least one processor to:
based at least in part on identification of at least a first activity being participated in by a user at least a threshold number of times greater than one, output the directions to the destination on the output device along with an indication of a location associated with the first activity.

* * * * *